(No Model.)
J. W. HOWELL.
GALVANIC BATTERY.
No. 373,021.  Patented Nov. 8, 1887.
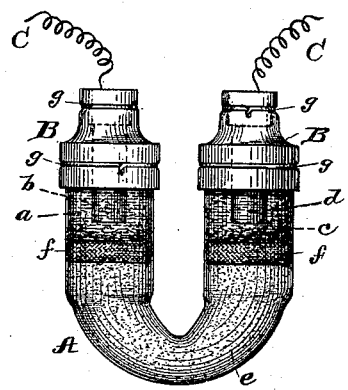
ATTEST:
INVENTOR:
N. PETERS, Photo-Lithographer, Washington, D. C.

UNITED STATES PATENT OFFICE.

JOHN W. HOWELL, OF NEW BRUNSWICK, ASSIGNOR TO THE EDISON LAMP COMPANY, OF HARRISON, NEW JERSEY.

GALVANIC BATTERY.

SPECIFICATION forming part of Letters Patent No. 373,021, dated November 8, 1887.

Application filed May 19, 1887. Serial No. 238,741. (No model.)

*To all whom it may concern:*

Be it known that I, JOHN W. HOWELL, of New Brunswick, in the county of Middlesex and State of New Jersey, have invented a certain new and useful Improvement in Electric Batteries, of which the following is a specification.

My invention relates to batteries of the Daniell type—that is, to a cell employing zinc and copper electrodes placed, respectively, in zinc-sulphate and copper-sulphate solutions. A difficulty which has arisen in these cells is the diffusion of the copper-sulphate solution so that it mixes with the zinc-sulphate solution and acts upon the zinc electrode.

The main object of my invention is to check or prevent this action in an effective manner and at the same time to produce a high-resistance practically-constant battery, and one which can be carried about without deterioration and without leaking, and which shall be of such size as to be conveniently carried in the pocket. Such a cell is designed to be used with a portable electrical testing or indicating apparatus to provide a constant source of current, especially for those volt-indicators or potentiometers in which a constant electro-motive force from a battery in a shunt is made to oppose the electro-motive force to be measured or indicated.

It has been proposed to prevent the diffusion of the copper sulphate in the Daniell battery by making the cell in the form of a U-tube, with the zinc and copper sulphate solutions in the ends of the tube, respectively, and separated by a mixture of sand and zinc oxide in the bend of the tube. This plan I have found to be defective, since the presence of the sand increases the resistance of the cell, and since the sand is not acted upon by any of the chemicals in the cell, wherefore its presence can be productive of no good.

According to my invention I place in the bend of the tube pure zinc oxide, ground and made into a paste. I prefer to make the paste by grinding the oxide as fine as possible in a saturated solution of zinc sulphate, employing about three parts in bulk of such solution to one part of the oxide. I prefer to grind the oxide in a mortar, adding the solution during the grinding until it is ground to the finest possible extent, and with no lumps remaining in it. If any small lumps remain, they will soak up zinc-sulphate solution after the mixture is placed in the cell, and so make the paste drier and cause the resistance of the cell to increase. I place this paste in the bend of a U-shaped tube and place in the respective ends of the tube above such paste the zinc-sulphate solution, in which is placed the zinc electrode, and the copper-sulphate solution containing the copper electrode. This simple arrangement produces a cell which will remain constant a very long time, provided it is kept in the same position and not moved from place to place. This is because the copper-sulphate solution as it diffuses combines with the zinc oxide of the separating-paste, forming a green salt which is insoluble in zinc sulphate, and therefore does no harm. This diffusion and combination takes place very slowly. The copper sulphate cannot pass through the zinc oxide, because it combines with it, and it is therefore impossible for any copper sulphate to reach the zinc sulphate in the other end of the cell until all of the zinc oxide has been combined with. If, however, the cell is intended to be a portable one—such as I have above set forth—other precautions are necessary, because the moving about of the cell causes the solutions to wash away the paste, so that such solutions may come together. To obviate this I may mix the zinc oxide with finely-ground plaster-of-paris, so that the paste will harden and set and so remain in place. This makes a portable cell and a fairly-constant one, but not so good as one employing the pure zinc oxide. I prefer, therefore, to place in each end of the tube over the zinc-oxide paste a thin layer of pure plaster-of-paris mixed with sulphate-of-zinc solution, so it can be poured into the tube, and will there set or harden and form in each end of the tube a porous partition insoluble in the liquids used in the cell, and effectually preventing the mixture of either of the solutions with the zinc oxide.

To prevent the leaking of the solutions from the ends of the cell I prefer to employ pieces of rubber tubing, one being placed around each end of the cell and the protruding end of the electrode, and secured by wrapping tightly with fine wire around the tube, and also around the electrode. The connecting-wires are suitably secured to the ends of the electrode. This construction provides a most efficient constant portable cell. In addition to the safeguard against leaking provided by the rubber tubing, such cells will not leak, because the copper sulphate when it combines with the zinc oxide forms a compound which takes up less space than the substances themselves, and this creates an inward pressure, whereby air will tend to pass in instead of the solution tending to pass out, and so the tendency to leaking will be overcome.

The accompanying drawing is a view in elevation illustrating the preferred form of my invention.

A is a U-shaped glass tube.

$a$ is the zinc-sulphate solution, and $b$ the zinc electrode; $c$, the copper-sulphate solution, and $d$ the copper electrode.

$e$ is the zinc-oxide paste.

$f f$ are the layers or partitions of plaster of-paris.

B B are sections of flexible-rubber tubing placed over the ends of the tube and the electrodes, and secured by wrappings $g$, of fine wire.

C C are wires extending from the electrodes.

What I claim is—

1. An electric battery having as active elements zinc sulphate and copper-sulphate solutions, said solutions being separated from each other by a conducting-paste of which a material which combines chemically with the copper sulphate forms a part, substantially as set forth.

2. An electric battery having as active elements zinc-sulphate and copper-sulphate solutions, said solutions being separated by a paste of zinc oxide mixed with zinc sulphate, substantially as set forth.

3. An electric battery having as active elements zinc-sulphate and copper-sulphate solutions, said solutions being separated from each other by a material with which the copper sulphate will combine chemically, and porous partitions between the active elements and said separating material, substantially as set forth.

4. An electric battery having as active elements zinc-sulphate and copper-sulphate solutions, said solutions being separated from each other by a paste of zinc oxide mixed with zinc-sulphate solution, and porous partitions between the active elements and said paste, substantially as set forth.

5. An electric battery having as active elements zinc-sulphate and copper-sulphate solutions, said solutions being separated from each other by a paste of zinc oxide mixed with zinc-sulphate solution, and partitions of plaster-of-paris between said paste and said active solutions, substantially as set forth.

6. In an electric battery, the combination of a U-shaped tube, zinc and copper sulphate solutions in the ends of said tube, respectively, and a paste of zinc oxide mixed with zinc-sulphate solution in the bend of the tube, substantially as set forth.

7. In an electric battery, the combination of a U-shaped tube, zinc and copper sulphate solutions in the ends of said tube, respectively, a conducting material in the bend of the tube, with which the copper sulphate will combine chemically, and layers of porous material between said active solutions and said conducting material, substantially as set forth.

8. In an electric battery, the combination of a U-shaped tube closed at its ends by water-tight coverings, zinc and copper sulphate solutions and zinc and copper electrodes in the ends of the tube, respectively, and a paste of zinc oxide mixed with zinc-sulphate solution in the bend of the tube, substantially as set forth.

9. In an electric battery, the combination of a U-shaped cell, an electrode protruding from each end of said cell, and a section of rubber tubing surrounding the cell and electrode at each end and secured tightly to the cell and electrode, substantially as set forth.

This specification signed and witnessed this 17th day of May, 1887.

JOHN W. HOWELL.

Witnesses:
WILLIAM PELZER,
E. C. ROWLAND.